United States Patent [19]

Ueda

[11] 4,362,624

[45] Dec. 7, 1982

[54] PAINT STRAINER

[76] Inventor: Yoshiaki Ueda, 33-3, Numa-cho, Kishiwada-shi, Osaka-fu, Japan

[21] Appl. No.: 279,216

[22] Filed: Jun. 30, 1981

[30] Foreign Application Priority Data

Feb. 23, 1981 [JP] Japan .............................. 56-25742[U]

[51] Int. Cl.$^{3}$ .............................................. B01D 29/10

[52] U.S. Cl. ............................... 210/497.2; 210/497.3

[58] Field of Search ................................ 210/335-339, 210/342, 473, 474, 481, 497.2, 497.3, 499

[56] References Cited

U.S. PATENT DOCUMENTS

| | | | |
|---|---|---|---|
| 3,567,033 | 3/1971 | Whelan | 210/497.2 |
| 3,741,397 | 6/1973 | Gerson | 210/497.2 |
| 3,971,305 | 7/1976 | Daswick | 210/474 X |
| 4,064,053 | 12/1977 | Gerson | 210/497.2 |

*Primary Examiner*—Thomas G. Wyse
*Attorney, Agent, or Firm*—Wenderoth, Lind & Ponack

[57] ABSTRACT

A strainer for paints or the like is proposed which comprises a main body portion and a filter plate portion, both carrying a filter cloth. When the filter plate portion is folded into the main body portion, there is left some space between the filter cloth on the former and that on the latter.

6 Claims, 6 Drawing Figures

PAINT STRAINER

BACKGROUND OF THE INVENTION

The present invention relates to a strainer for prepared paint or the like.

In painting, the final painted surface would not be satisfactory if the paint used contains foreign matter such as dirt or hair. Therefore, it is customary to strain the prepared paint before use.

For straining of paints, filter paper of good quality is usually used. But, it takes a very long time for straining. Also, for paints containing metallic particles (fine powder of aluminum), such particles are not passed but trapped. On the other hand, with a filter paper of larger mesh foreign matter could not be removed satisfactorily.

SUMMARY OF THE INVENTION

An object of the present invention is to provide a strainer which can strain paints or the like in a shorter time.

Another object of the present invention is to provide a strainer which can remove any foreign matter without trapping metallic particles.

A further object of the present invention is to provide a strainer which is convenient for packing, storage and transportation.

Other objects and advantages of the present invention will become apparent from the following description taken with reference to the accompanying drawings, in which:

DETAILED DESCRIPTION OF THE INVENTION

Figure 1:
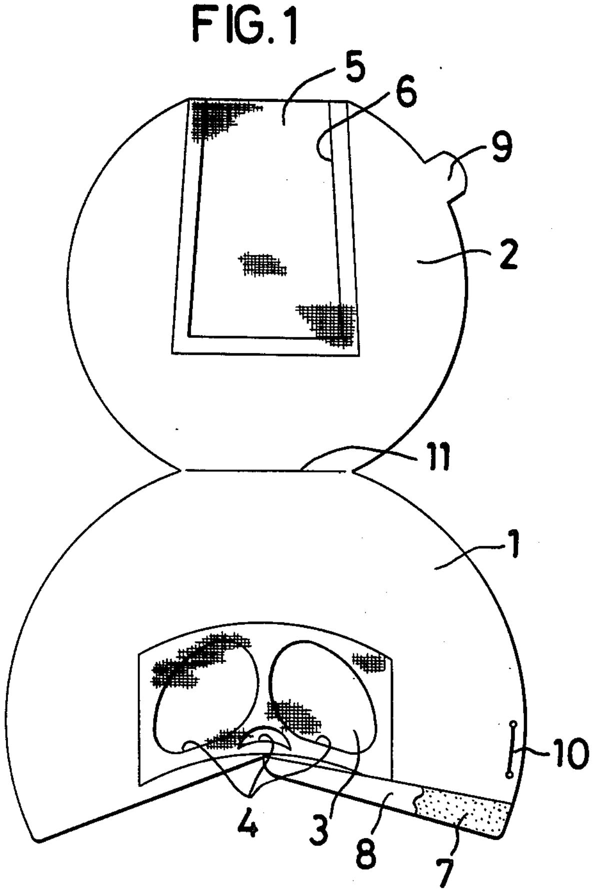
FIG. 1 is a development of the first embodiment of this invention.
Figure 2:
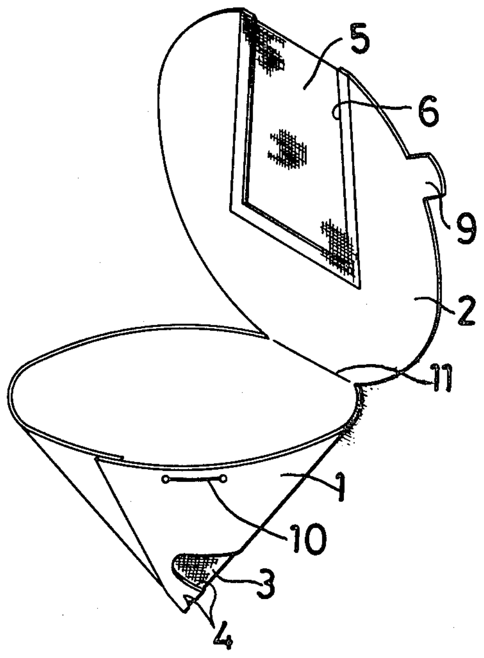
FIG. 2 is a perspective view of the same ready for use.
Figure 3:
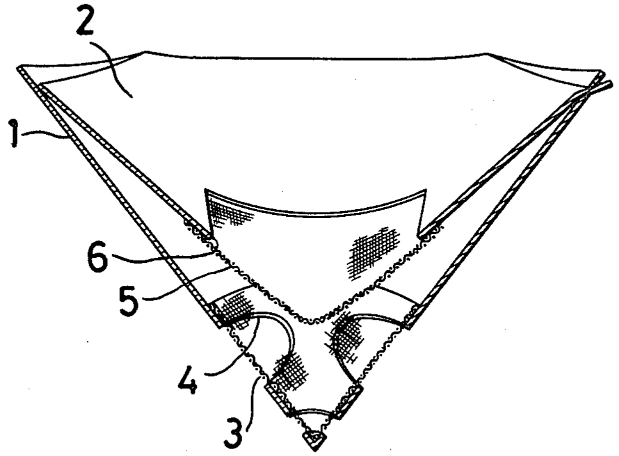
FIG. 3 is a vertical sectional view of the same in use.

Referring to FIGS. 1–3, a strainer according to this invention comprises a main body 1 of a funnel shape and an inner filter plate 2 adapted to be folded into the main body for use. The filter plate 2 may be either integral with the main body 1 so as to be bent along a line 11 or separate from the main body so as to be attachable thereto as by an adhesive.

The main body 1 and the filter plate 2 are made of a flexible material such as paper. The filter plate 2 is substantially circular and so shaped that when it is folded toward the main body 1 into a conical shape, some space will be left between the main body 1 and the filter plate 2 (FIG. 3).

The main body 1 has a filter cloth 3 pasted to the body so as to cover three openings 4. The filter plate 2 has a filter cloth 5 pasted to the filter plate so as to cover a notch 6 formed therein. The strainer as shown in FIG. 1 can be easily produced by cutting out a cardboard into a shape as shown in FIG. 1 with the notch 6 and the openings 4 formed therein. The cut-out paper is then formed with a folding line 11 and filter cloths 3 and 5 are pasted to the paper so as to cover the openings 4 and the notch 6, respectively. An adhesive is applied to the paper edge at 7 and is covered by a tape 8 to prevent the adhesive from sticking to any other body before use.

For use, the tape 8 is removed and the main body portion 1 is brought to a conical shape. Then, its edges are overlapped each other and pasted together to form a funnel shaped main body 1 (FIG. 2). The filter plate portion 2 is pushed into a conical shape into the main body 1 thus formed. A projection 9 on the filter plate is put in a cut 10 in the main body to hold the filter plate in position. The strainer is now ready for use. The inner filter cloth 5 is located over the filter cloth 3 with some space left therebetween (FIG. 3).

The notch 6 and openings 4 may be of any other suitable shape. A filter paper may be used instead of filter cloth.

In use, when a prepared paint is poured into the strainer, it is first filtered by the filter cloth 5 and then by the filter cloth 3.

Experiments show that the time taken for filtering is considerably shorter than two filter cloths spaced therebetween than with them overlapped. For paints containing metallic particles, filter cloth of a mesh sufficiently coarse to pass such particles may be used to prevent them from being trapped without passing any foreign matter.

The inner filter cloth 5 may be of the same mesh as that of the outer filter cloth 3, but preferably the outer filter cloth 3 should have a mesh coarse just enough to pass metallic particles and the inner filter cloth 5 have a coarser mesh than that to reduce the time taken for filtering.

Figure 4:
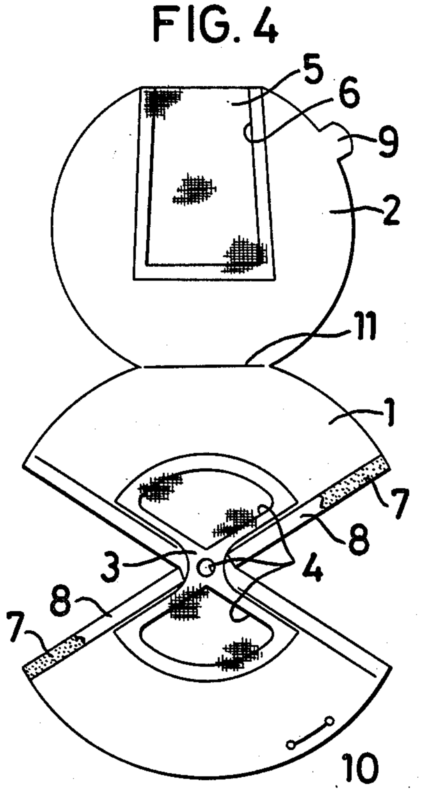
FIG. 4 is a view similar to FIG. 1 of the second embodiment.
Figure 5:
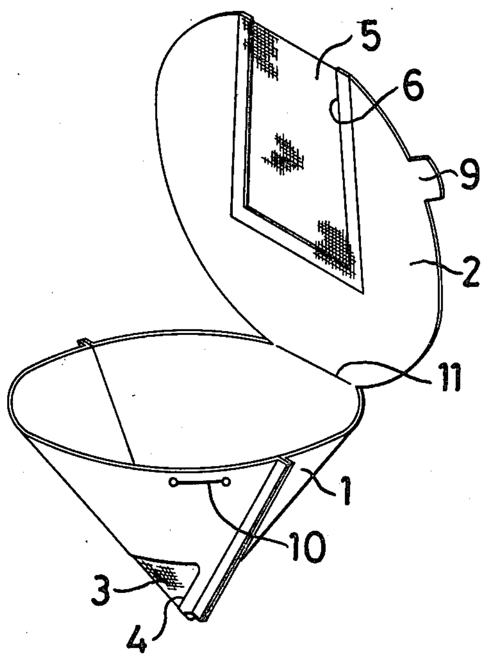
FIG. 5 is a view thereof similar to FIG. 2.
Figure 6:
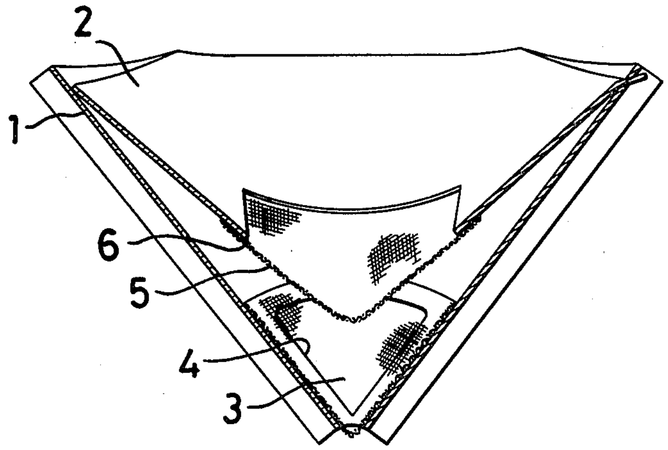
FIG. 6 is a view thereof similar to FIG. 3.

In FIGS. 4–6, another embodiment is shown which is particularly suitable for mass production. The main body 1 has two substantially fan-shaped sections each having an opening 4. These openings and another small opening 4 are covered by a single filter cloth 3. An adhesive is applied to the main body at two edges at 7 and is covered by tapes 8.

In use, the tapes 8' are removed and the opposing edges are pasted together to make the main body into a funnel shape. The rest is the same as the first embodiment.

Although the embodiments are provided with a single filter plate, two or more filter plates may be provided. For example, a strainer according to the present invention may be provided with a pair of filter plates of different sizes opposed to each other.

In view of the fact that some amount of space is formed between the upper filter and the lower filter, the time taken for straining is relatively short in spite of the use of two filter cloths. Further, the use of two filters of different mesh makes it possible to trap any foreign matter without trapping metallic particles. In addition, it is much more economical to use a strainer according to this invention rather than using two conventional strainers overlapped one upon another.

What I claim:

1. A strainer for paints or the like comprising a main body portion formed with at least one hole and having a first or lower filter means attached thereto so as to cover said hole and adapted to be folded into a funnel shape and a filter plate portion connected to said main body portion and formed with a notch and a second or upper filter means attached thereto so as to cover said notch and adapted to be folded into said main body already brought to a funnel shape so that some space will be left between said first filter means and said second filter means.

2. A strainer as claimed in claim 1 wherein said first and second filter means are a filter cloth.

3. A strainer as claimed in claim 1 wherein said main body portion has a pair of large holes and a small hole at a position corresponding to the bottom of the strainer.

4. A strainer as claimed in claim 1 wherein said main body portion comprises a pair of fan-shaped portions connected together at their narrow end.

5. A strainer as claimed in claim 1 wherein said main portion further comprises adhesive means applied to edge thereof to keep it in a funnel shape and a tape covering said adhesive means.

6. A strainer as claimed in claim 1 or 5 wherein said filter plate portion has a projection and said main body portion has a cut to receive said projection, thereby holding said filter plate portion in position.

* * * * *